United States Patent [19]
Fujioka et al.

[11] Patent Number: 5,703,663
[45] Date of Patent: Dec. 30, 1997

[54] PROJECTION TYPE LIQUID CRYSTAL DISPLAY APPARATUS

[75] Inventors: Kazuyoshi Fujioka, Higashiosaka; Masumi Kubo; Yutaka Takafuji, both of Nara, all of Japan

[73] Assignee: Sharp Kabushiki Kaisha, Osaka, Japan

[21] Appl. No.: 687,658

[22] Filed: Jul. 26, 1996

[30] Foreign Application Priority Data

Jul. 28, 1995 [JP] Japan ................... 7-193930

[51] Int. Cl.⁶ ................... G02F 1/1335; G03B 21/00
[52] U.S. Cl. ................... 349/5; 349/7; 353/70
[58] Field of Search ................... 349/5, 6, 7; 353/70

[56] References Cited

U.S. PATENT DOCUMENTS

| | | | |
|---|---|---|---|
| 5,467,207 | 11/1995 | Forkner et al. | 349/5 |
| 5,612,797 | 3/1997 | Clarke | 349/5 |
| 5,622,417 | 4/1997 | Conner et al. | 353/70 |

FOREIGN PATENT DOCUMENTS

| | | |
|---|---|---|
| 55-055 314 | 4/1980 | Japan . |
| 7-027 132 | 8/1987 | Japan . |

*Primary Examiner*—William L. Sikes
*Assistant Examiner*—Tiep H. Nguyen
*Attorney, Agent, or Firm*—David G. Conlin; Milton Oliver

[57] ABSTRACT

The projection type liquid crystal display apparatus of the invention includes: a light source; a liquid crystal display device; and a projection lens. In the projection type liquid crystal display apparatus, the projection lens and the liquid crystal display device are arranged to satisfy the relationship: $\theta_{LC-max}-1° \leq \theta_{LENS} \leq \theta_{LC-max}+1°$, where $\theta_{LENS}$ is a collection angle of the projection lens and $\theta_{LC-max}$ is a maximum viewing angle of the liquid crystal display device at which a contrast ratio of an image light beam emitted through the projection lens $CR_{PROJ}$ is equal to a prescribed contrast ratio $CR_{TARGET}$, and $CR_{PROJ}$ is calculated by the following equation:

$$CR_{PROJ} = \int T_{max}(\theta_{LC}, u, V_{LC-max}) \cdot t(\theta_{LC}) d\theta_{LC} / \int T_{min}(\theta_{LC}, u, V_{LC-max}) \cdot t(\theta_{LC}) d\theta_{LC},$$

where, $u = d \cdot \Delta n/\lambda$; $t(\theta)$ is a luminance at an angle $\theta$ of the light beam incident onto the liquid crystal display device; $\int T_{max}(\theta_{LC}, u, V_{LC-max})$ is a maximum transmittance at $\theta_{LC}$; and $\int T_{min}(\theta_{LC}, u, V_{LC-max})$ is a minimum transmittance at $\theta_{LC}$.

8 Claims, 14 Drawing Sheets

PROJECTION TYPE LIQUID CRYSTAL DISPLAY APPARATUS

BACKGROUND OF THE INVENTION

1. Field of the Invention

The present invention relates to a projection type liquid crystal display apparatus using a liquid crystal display device.

2. Description of the Related Art

A conventional projection type liquid crystal display apparatus using a liquid crystal display device utilizes an arrangement such as that shown in FIG. 13 (see, for example, Japanese Laid-Open Patent Publication No. 55-55314). Specifically, light emitted from a light source 12 is converged by a condenser lens 13 so as to be irradiated onto a liquid crystal display device 20 in which a plurality of pixels, having a transmittance variable in accordance with a voltage applied thereto, are arranged in matrix. The liquid crystal display device 20 has a configuration in which a liquid crystal layer is sandwiched between a TFT glass substrate 1 having a plurality of thin-film transistors (TFTs) thereon and a light-blocking glass substrate 2. An image is displayed on the liquid crystal display device 20 by selectively turning ON/OFF the respective pixels. The light of the displayed image is emitted from the liquid crystal display device 20 and then projected onto a screen 15 via a projection lens 14. In this case, by varying a voltage applied to the respective pixels of the liquid crystal display device 20 in accordance with a television video signal, a television video can be displayed on the screen 15. In FIG. 13, an optical axis is denoted by 16.

In order to project a moving picture onto the screen 15 of a projection type liquid crystal display apparatus having such an arrangement, it is necessary to use a liquid crystal display device, having a transmittance which can vary rapidly enough to keep up with the variation in the level of a voltage applied to the respective pixels, as the liquid crystal display device 20. In addition, in order to display a video excellent in sharpness, it is desirable to use a liquid crystal display device which can display a black level of a video signal as dark as possible and a white level as bright as possible or a liquid crystal display device realizing a high contrast ratio. As a liquid crystal display device which can satisfy these requirements in practical use, generally a liquid crystal display device in twisted nematic mode (hereinafter, simply referred to as "TN mode") is used. The liquid crystal cell in TN mode, normally white mode, is inserted between two polarizers disposed such that the polarization axes thereof cross each other at a right angle.

In using such a liquid crystal display device in TN mode for a projection type liquid crystal display apparatus, the brightness is thought more important than the contrast ratio. The reason is as follows. Since a pair of polarizers are used in a liquid crystal display device in TN mode, the brightness of resulting image light is decreased to one-half of that of the original light emitted from the light source simply by the use of the polarizers. Moreover, the brightness is further decreased owing to the transmittance of the liquid crystal cell and the numerical aperture of a light-blocking pattern (black mask) to finally become about one-tenth of that of the original light.

The numerical aperture of the light-blocking pattern is affected by the size of the lines of the electrode and that of switching elements and is restricted by a selected design, the type of a fabrication apparatus and the like. In addition, the transmittance of the liquid crystal cell varies depending upon $d \cdot \Delta n / \lambda$, or the result obtained by dividing the product ($d \cdot \Delta n$) obtained by multiplying together the birefringence ($\Delta n$) of a liquid crystal material and the thickness (d) of the liquid crystal layer of the liquid crystal cell (hereinafter, simply referred to as a "cell thickness") by a wavelength ($\lambda$) as shown in FIG. 14. Thus, the fabrication conditions for the liquid crystal cell can be optimized such that the transmittance becomes maximum. In this case, the transmittance becomes maximum when $d \cdot \Delta n / \lambda = 0.86$ (for $\lambda = 550$ nm). For color display, a color balance among the three primary colors of red ($\lambda = 650$ nm±30 nm), green ($\lambda = 550$ nm±30nm) and blue ($\lambda = 450$ nm±30 nm) is desirable but may leads to a degradation of brightness. However, when $d \cdot \Delta n / \lambda$ is set to satisfy $0.78 < d \cdot \Delta n / \lambda < 1$ (for $\lambda = 550$ nm), since the transmittance of a liquid crystal cell depends upon a wavelength, the brightness is not degradded. That is to say, the combination of the birefringence ($\Delta n$) of a liquid crystal material and the cell thickness (d) is determined based on $d \cdot \Delta n / \lambda$ so as to satisfy the above-mentioned relationship.

Next, a contrast ratio of such a liquid crystal cell will be described. When the viewing direction tilts from the direction vertical to the liquid crystal cell by a viewing angle $\theta_{LC}$ as shown in FIG. 6, the larger $\theta_{LC}$ becomes, the lower the contrast ratio becomes, as shown in FIG. 8. Such a characteristic causes a serious problem on a direct-viewing type display. On the other hand, in a projection type liquid crystal display apparatus, since a maximum collection angle $\theta_{LENS}$ of a projection lens is about ±10°, a contrast ratio of about 200 is realized for a blue light beam in which the contrast ratio is least likely to be high (hereinafter, such a contrast ratio will be referred to as a "blue contrast ratio"). Thus, a decrease in the contrast ratio has not conventionally caused a serious problem in a projection type liquid crystal display apparatus.

However, a contrast ratio of about 200 is a required minimum value in various video signal standards such an NTSC, PAL and the like. Thus a conventional projection type liquid crystal display apparatus cannot deal with a next generation high-definition television video signal requiring a blue contrast ratio of at least 300, preferably 400 or more. Such an insufficient blue contrast ratio results from the fact that a contrast ratio of a liquid crystal cell in TN mode depends upon a viewing angle and the arrangement of an optical system provided for a projection type liquid crystal display apparatus. Hereinafter, the reason will be described in further detail.

First, the coordinates required in the following description are shown in FIG. 6. The vertical axis passing through the center of a liquid crystal display device is assumed to be a Z axis; an X axis and a Y axis are defined as existing on the surface of a substrate of the liquid crystal display device and crossing each other at a right angle; the Y-axis direction in the X-Y plane is defined as 0°; the clockwise direction with respect to the Y-axis direction is assumed to be "+"; and a tilt angle from the Z axis toward the X-Y plane is defined as the above-described viewing angle direction $\theta_{LC}$. It is known that, when the liquid crystal cell is subjected to an alignment treatment by rubbing the cell as shown in FIG. 7, i.e., the upper substrate 1 is rubbed in a direction 10 from +45° to +225° and the lower substrate 2 is rubbed in a direction 11 from +315° to +135°, the contrast ratio has a viewing angle dependence $CR(\theta_{LC})$ with respect to the viewing angle direction $\theta_{LC}$ as shown in FIG. 8.

A viewing angle dependence $CR(\theta_{LC})$ of the contrast ratio is defined by the following Equation (1):

$$CR(\theta_{LC}) = T_{max}(\theta_{LC}, u, V_{LC-max})/T_{min}(\theta_{LC}, u, V_{LC-min}) \quad (1)$$

where, $T_{max}(\theta_{LC}, u, V_{LC-max})$ is a maximum transmittance at which display is possible with respect to a viewing angle direction $\theta_{LC}$ of a liquid crystal display device; $T_{min}(\theta_{LC}, u, V_{LC-min})$ is a minimum transmittance satisfying the same condition; $u=d\cdot\Delta n/\lambda$; and $V_{LC-max}$ and $V_{LC-min}$ are voltages $V_{LC}$ to be applied to the liquid crystal layer for maximizing and minimizing the transmittance of the liquid crystal cell, respectively.

In general, the maximum transmittance $T_{max}(\theta_{LC}, u, V_{LC-max})$ is obtained when $V_{LC}=0$ V. On the other hand, though the minimum transmittance $T_{min}(\theta_{LC}, u, V_{LC-min})$ is varied in accordance with a threshold voltage of a liquid crystal material to be used, $T_{min}(\theta_{LC}, u, V_{LC-min})$ is generally obtained when $V_{LC}=4$ to 5 V in the case of a liquid crystal display device provided with TFT elements as switching elements.

In the case of using a liquid crystal display device in which a contrast ratio has such a viewing angle dependence for a projection type liquid crystal display apparatus such as that shown in FIG. 13, a contrast ratio $CR_{PROJ}$ of the light emitted through the projection lens 14 is defined by the following Equation (2), where an integration range is from $+\theta_{LENS}$ to $-\theta_{LENS}$:

$$CR_{PROJ}=\int T_{max}(\theta_{LC}, u, V_{LC-max})\cdot t(\theta_{LC})\, d\theta_{LC}/\int T_{min}(\theta_{LC}, u, V_{LC-min})\cdot t(\theta_{LC})d\theta_{LC} \quad (2)$$

where, $\theta_{LENS}$ is a collection angle of the projection lens 14; and $t(\theta)$ is a luminance with respect to an angle $\theta$ of the light incident onto the liquid crystal display device 20.

An actual collection angle $\theta_{LENS}$ of a conventional projection type liquid crystal display apparatus for practical use is about $\pm 9°$ and an effective luminance $t(\theta)$ can be obtained in the range of about $\pm 12°$. On the other hand, when $d\cdot\Delta n/\lambda$ is set so as to satisfy the conventional condition $0.78<d\cdot\Delta n/\lambda<1$ (for $\lambda=550$ nm), the lowest blue contrast ratio (for $\lambda=450$ nm $\pm 30$ nm) becomes about 200 as indicated in FIG. 15 by the solid line representing a contrast ratio obtained by Equation (2).

Brightness (BR) which is most important in a projection type liquid crystal display apparatus is also represented by the broken line in FIG. 15. Brightness (BR) is defined by the following Equation (3), where an integration range is from $+\theta_{LENS}$ to $-\theta_{LENS}$:

$$BR=A\int T_{max}(\theta_{LC}, u, V_{LC-max})\cdot t(\theta_{LC})d\theta_{LC} \quad (3)$$

where A is a luminance ratio constant.

As shown in FIG. 15, the contrast ratio $CR_{PROJ}$ and the brightness (BR) are in a trade-off relationship. If a contrast ratio $CR_{PROJ}=300$ is to be realized, then the brightness becomes one-half of a conventional brightness, so that the quality of the image produced is considerably degraded.

SUMMARY OF THE INVENTION

The projection type liquid crystal display apparatus of the invention includes: a light source; a liquid crystal display device which receives a light beam emitted from the light source and forms an image light beam, the liquid crystal display device including a liquid crystal layer sandwiched between a pair of substrates, and electrodes for controlling an electro-optical effect of the liquid crystal layer; and a projection lens which receives the image light beam and directs the image light beam onto a screen. In the projection type liquid crystal display apparatus, the projection lens and the liquid crystal display device are disposed to satisfy the relationship: $\theta_{LC-max}-1°\leq\theta_{LENS}\leq\theta_{LC-max}+1°$, where $\theta_{LENS}$ is a collection angle of the projection lens and $\theta_{LC-max}$ is a maximum viewing angle of the liquid crystal display device, at which a contrast ratio of the image light beam emitted through the projection lens $CR_{PROJ}$ is equal to a prescribed contrast ratio $CR_{TARGET}$, and $CR_{PROJ}$ is calculated by the following equation:

$$CR_{PROJ}=\int T_{max}(\theta_{LC}, u, V_{LC-max})\cdot t(\theta_{LC})\, d\theta_{LC}/\int T_{min}(\theta_{LC}, u, V_{LC-min})\cdot t(\theta_{LC})d\theta_{LC}$$

where $u=d\cdot\Delta n/\lambda$; d is a thickness of the liquid crystal layer; $\Delta n$ is a birefringence of a liquid crystal material of the liquid crystal layer; $\lambda$ is a wavelength of the light beam; $t(\theta)$ is a luminance at an angle $\theta$ of the light beam incident onto the liquid crystal display device; $\theta_{LC}$ is a viewing angle of the liquid crystal display device with respect to the normal to a display plane of the liquid crystal display device; $V_{LC-max}$ is a voltage applied to the liquid crystal layer for maximizing a transmittance of the liquid crystal display device; $V_{LC-min}$ is a voltage applied to the liquid crystal layer for minimizing the transmittance of the liquid crystal display device; $\int T_{max}(\theta_{LC}, u, V_{LC-max})$ is a maximum transmittance at $\theta_{LC}$; and $\int T_{min}(\theta_{LC}, u, V_{LC-max})$ is a minimum transmittance at $\theta_{LC}$.

In one embodiment, d and $\Delta n$ are set such that $d\cdot\Delta n/\lambda$ is within the range of $u_{TARGET}-0.05\leq d\cdot\Delta n/\lambda\leq u_{TARGET}+0.05$, where $u_{TARGET}$ is a prescribed u value which satisfies the condition that $CR_{PROJ}$ is equal to $CR_{TARGET}$ at the collection angle of the projection lens $\theta_{LENS}$.

In another embodiment, the liquid crystal display device is disposed such that a viewing angle direction of the liquid crystal display device for exhibiting a maximum contrast ratio is aligned with an optical axis of the light beam incident onto the liquid crystal display device.

In still another embodiment, $u\leq 0.86$ and $6°\leq\theta_{LENS}\leq 12°$ such that a contrast ratio for a blue light beam becomes 300 or higher.

Thus, the invention described herein makes possible the advantage of providing a projection type liquid crystal display apparatus which can obtain a bright image while also realizing a high contrast ratio.

These and other advantages of the present invention will become apparent to those skilled in the art upon reading and understanding the following detailed description with reference to the accompanying figures.

BRIEF DESCRIPTION OF THE DRAWINGS

FIG. 5A is a front view of a liquid crystal display device used for the projection type liquid crystal display apparatus shown in FIG. 4, while

DESCRIPTION OF THE PREFERRED EMBODIMENTS

First, the fundamental concept of the present invention will be described.

According to the present invention, two conditions are required to be satisfied. The first condition is as follows.

Figure 1:
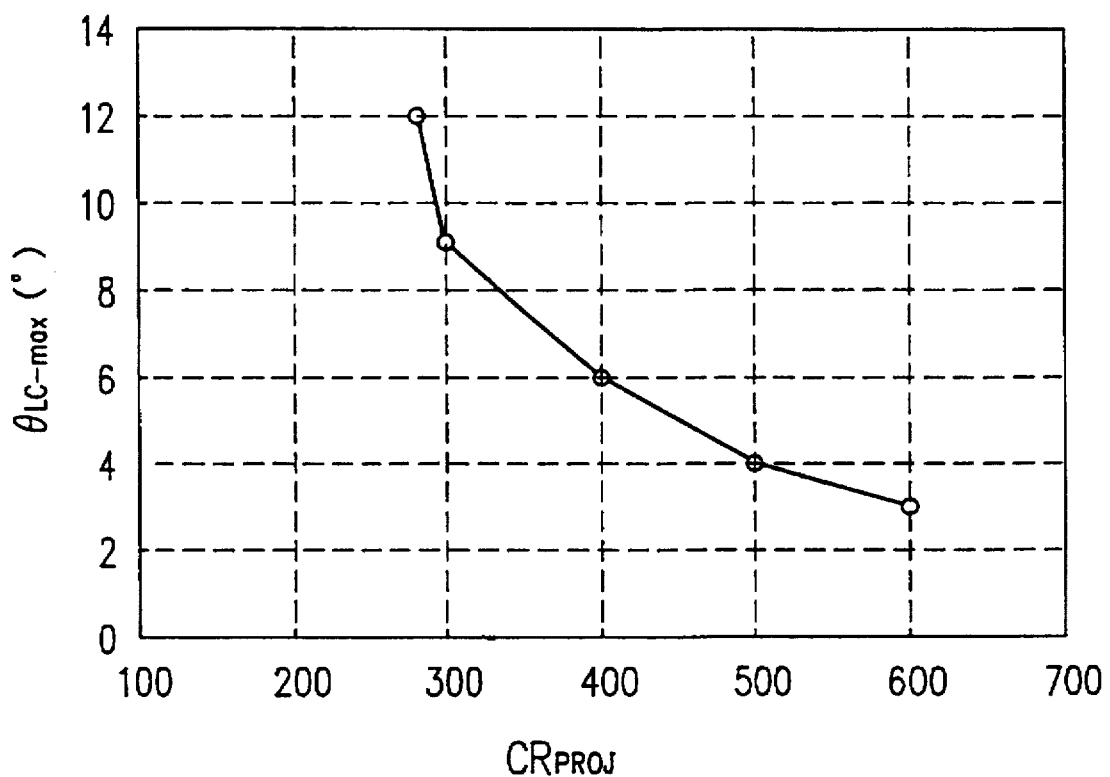
FIG. 1 is a graph showing a relationship between a contrast ratio $CR_{PROJ}$ of the light emitted through a projection lens and a maximum viewing angle $\theta_{LC-max}$ of a liquid crystal display device.

A collection angle $\theta_{LENS}$ of the projection lens is set to be equal to or smaller than a maximum viewing angle $\theta_{LC-max}$ of the projection lens based on the relationship shown in FIG. 1 between a contrast ratio $CR_{PROJ}$ of the light emitted through the projection lens and $\theta_{LC-max}$.

The conventional fabrication requirement for optimum transmittance of a liquid crystal display device, or $d \cdot \Delta n/\lambda$, is set so as to satisfy: $0.78 < d \cdot \Delta n/\lambda < 1 (\lambda=550 \text{ nm})$. A maximum viewing angle $\theta_{LC-max}$ is calculated based on the following Equation (2) for obtaining a target contrast ratio $CR_{TARGET}$ of the light emitted through the projection lens:

$$CR_{TARGET}=CR_{PROJ}=\int T_{max}(\theta_{LC}, u, V_{LC-max}) \cdot t(\theta_{LC}) d\theta_{LC} / \int T_{min}(\theta_{LC}, u, V_{LC-min}) \cdot t(\theta_{LC}) d\theta_{LC} \quad (2)$$

As described above, if $\theta_{LENS} \leq \theta_{LC-max}$ then the actual contrast ratio $CR_{PROJ}$ becomes equal to or higher than the target contrast ratio $CR_{TARGET}$.

Figure 2:
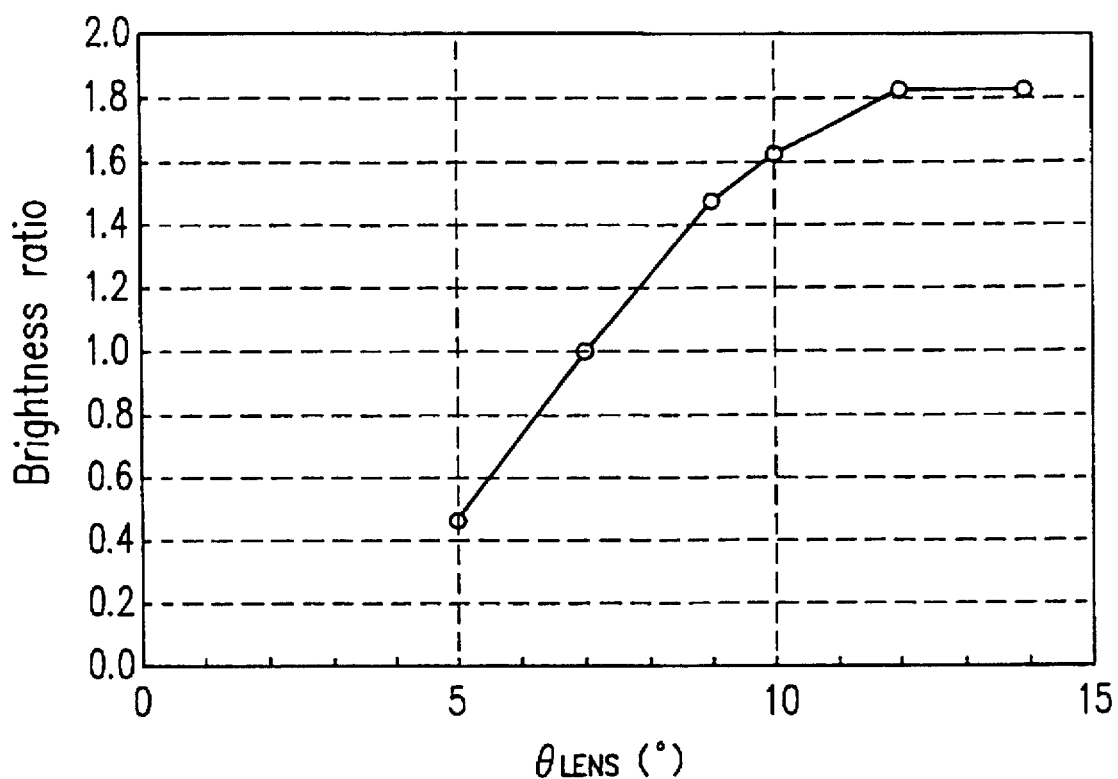
FIG. 2 is a graph showing a relationship between a collection angle $\theta_{LENS}$ of the projection lens and a display luminance ratio (brightness ratio).

In addition, the brightness of the projected light varies depending upon the relationship shown in FIG. 2 between $\theta_{LENS}$ and a display luminance ratio (or brightness ratio) (BR). The brightness ratio (BR) is represented by the following Equation (3):

$$BR=A \int T_{max}(\theta_{LC}, u, V_{LC-max}) \cdot t(\theta_{LC}) d\theta_{LC} \text{(where A is a luminance ratio constant)} \quad (3)$$

In this case, if the requirement for realizing a contrast ratio equal to or higher than $CR_{TARGET}$ or the inequality $\theta_{LENS} \leq \theta_{LC-max}$ is satisfied, the brightness of the projected light becomes maximum when $\theta_{LENS}=\theta_{LC-max}$.

On the other hand, since a permissible variation range of a projection type liquid crystal display apparatus actually used is about 15%, the variation range of $\theta_{LENS}$ is about $\pm 1°$.

Thus, according to the present invention, by setting $\theta_{LENS}$ equal to $\theta_{LC-max} \pm 1°$, $CR_{TARGET}$ is realized.

The second condition will be described. The transmittance of a liquid crystal display device in a viewing angle direction $\theta_{LC}$ depends upon $n=d \cdot \Delta n/\lambda$. On the other hand, a contrast ratio $CR_{PROJ}$ is represented by the above Equation (2). Thus, the smaller u ($=d \cdot \Delta n/\lambda$) associated with $CR_{PROJ}$ becomes, the higher $CR_{PROJ}$ becomes, so that a maximum viewing angle $\theta_{LC-max}$ becomes wider. As to the viewing angle dependence of the contrast ratio, an inequality $u \leq 0.86$ is satisfied according to the present invention. This is because, though u has conventionally been set in the range $0.78 < u < 1 (\lambda=550 \text{ nm})$ so as not to considerably degrade the transmittance of a liquid crystal display device, a maximum viewing angle $\theta_{LC-max}$ in which a target contrast ratio $CR_{TARGET}$ is realized can be enlarged by setting: $u \leq 0.86$.

In this case, in order to realize a contrast ratio variation range of about $\pm 15\%$ in the same way as in the above description, the permissible variation range of u becomes $\pm 0.03$ when $u \leq 0.86$. This value corresponds to the case where the contrast ratio for blue light is 300 or higher. If the blue contrast ratio is about 200 as is currently set, then the permissible variation range of u becomes +0.05.

Then, by intentionally changing u, a viewing angle can be selected from a wide range of $\theta_{LC-max}$ in which $CR_{TARGET}$ is realized. As a result, it is possible to design an optimum liquid crystal display device for an optical system using a projection lens having an arbitrary collection angle $\theta_{LENS}$. Even though the transmittance of a liquid crystal display device is considerably decreased in practical use if $u \leq 0.86$, by enlarging $\theta_{LC-max}$, $\theta_{LENS}$ can also be enlarged and the decrease in the brightness of the projected light will not be as large as the decrease in u.

For example, in an optical system for a projection type liquid crystal display apparatus actually and practically used as a product, in the case where an effective luminance range (or a range where light beams exist) of a luminance $t(\theta)$ with respect to an angle ($\theta$) of the light incident onto the liquid crystal display device is about $\pm 12°$ and the conventional condition: $0.78 < u < 1 (\lambda=550 \text{ nm})$ is satisfied, $\theta_{LENS}$ is required to be equal to or smaller than $6°$ when a blue contrast ratio ($\lambda=450 \text{ nm}$) is to be 300 or higher. In this case, assuming that a maximum brightness of the projected light is indicated by $BR_{CONV}(u=0.86)$, if u and $\theta_{LENS}(=\theta_{LC-max})$ are combined while satisfying the conditions: $u \leq 0.86$ ($\lambda=550 \text{ nm}$) and $6° < \theta_{LENS} < 12°$ such that a blue contrast ratio ($\lambda=450 \text{ nm}$) becomes 300 or higher, a brightness $BR_{NEW}$ of the projected light under these conditions always becomes equal to or higher than $BR_{CONV}$. Therefore, even in the case where a blue contrast ratio ($\lambda=450 \text{ nm}$) is set to be 300 or higher, a high contrast ratio can be obtained without decreasing the brightness. Nevertheless, if an effective luminance range of a luminance $t(\theta)$ with respect to an angle $\theta$ of the light incident onto a liquid crystal display device is varied, the range where a high contrast ratio and a sufficient brightness of the projected light are maintained is naturally varied.

Figure 3:
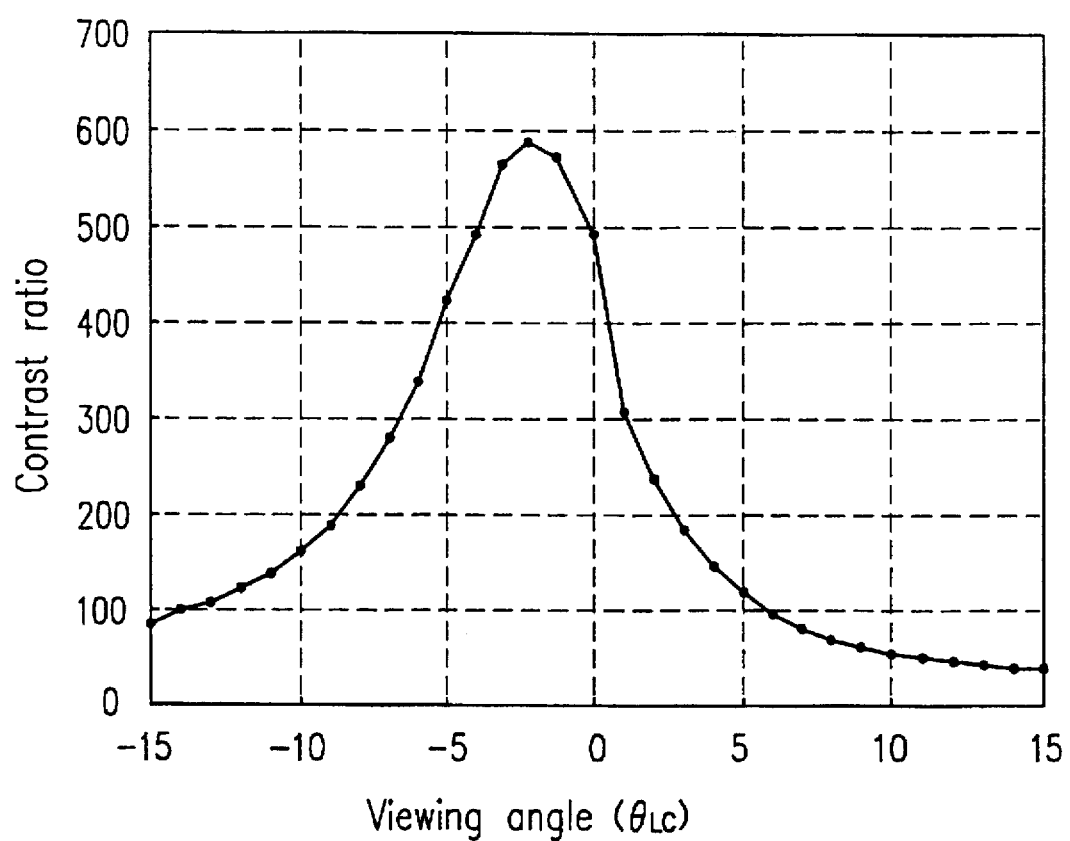
FIG. 3 is a graph illustrating viewing angle dependences corresponding to respective contrast ratios in a Y-Z plane direction of a liquid crystal display device, in which abscissas indicate viewing angles ($\theta_{LC}$) and ordinates indicate contrast ratios.

Moreover, according to the present invention, the integration range of Equation (2) used for calculating $CR_{PROJ}$ is assumed to be an integration range in which a maximum contrast direction $\theta_{max}$ exists at the center. In the above description, the integration range is assumed to be $\pm \theta_{LC-max}$ around $\theta_{LC}=0°$. In general, the contrast ratio of a liquid crystal display device has such a viewing angle dependence that a viewing angle $\theta_{LC}$ of 0° does not correspond to the maximum contrast ratio direction $\theta_{max}$ as shown in FIG. 3. In Japanese Laid-Open Patent Publication No. 62-186225, a liquid crystal display device is disposed such that the optical axis of an optical system is aligned with a maximum contrast direction, thereby increasing the contrast ratio. According to the present invention, the integration range is assumed to use the maximum contrast direction $\theta_{max}$ as a center for further increasing the contrast ratio.

The present invention is also applicable to various types of liquid crystal display devices in which a projection lens is provided with a zoom mechanism or diaphragm mechanism or a condenser system (or a micro lens) is provided for each picture element, even though the luminance t(θ) with respect to an angle θ of the light incident onto the liquid crystal display device becomes different.

Hereinafter, the present invention will be described in detail by way of illustrative examples with reference to the accompanying drawings.

EXAMPLE 1

Figure 4:
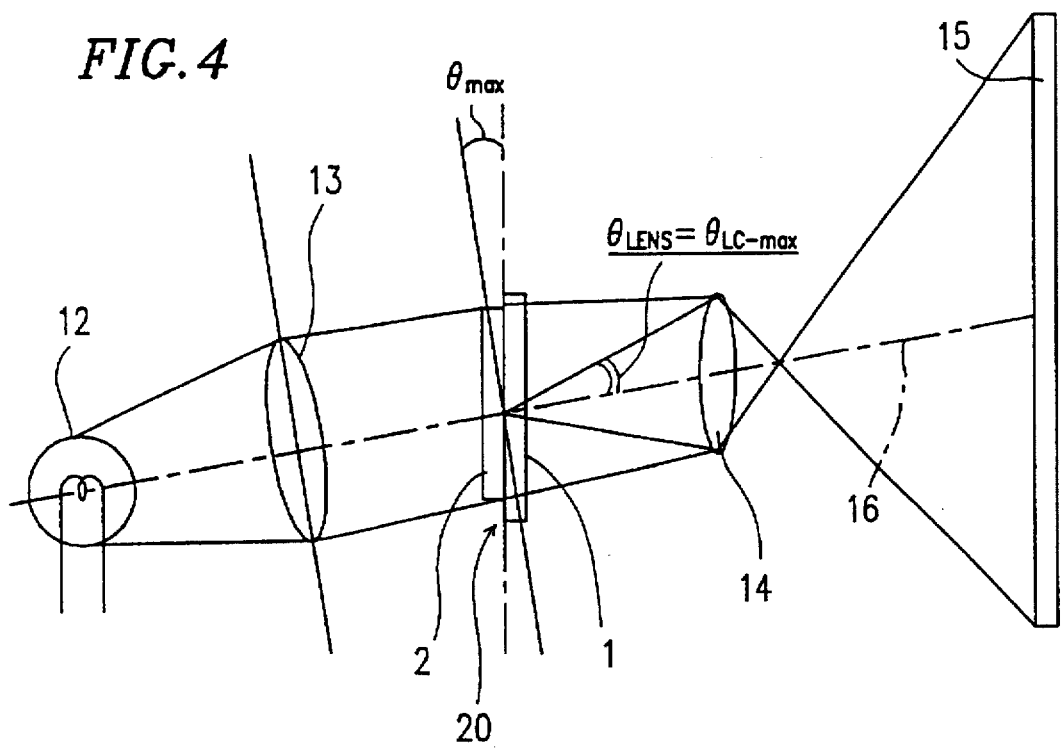
FIG. 4 shows an arrangement for a projection type liquid crystal display apparatus in a first example of the present invention.

FIG. 4 illustrates an arrangement for a projection type liquid crystal display apparatus in a first example of the present invention. The projection type liquid crystal display apparatus includes: a light source 12; a condenser lens 13 for converging the light emitted from the light source 12; a liquid crystal display device 20 to be irradiated with the light converged by the condenser lens 13; a projection lens 14 onto which the light emitted from the liquid crystal display device 20 is incident; and a screen 15 onto which the light passed through the projection lens 14 is projected.

In the liquid crystal display device 20, a plurality of pixels having a transmittance variable in accordance with a voltage applied thereto are arranged in matrix. The liquid crystal display device 20 is configured such that a liquid crystal layer is sandwiched between a TFT glass substrate 1 having a plurality of TFTs thereon and a light-blocking glass substrate 2 and displays an image thereon by selectively turning ON/OFF the respective pixels. This liquid crystal display device 20 is disposed such that the optical axis 16 defined by the position of the condenser lens 13 is aligned with a viewing angle direction of the liquid crystal display device 20, at which angle a maximum contrast ratio is realized. The image light displayed on the liquid crystal display device 20 is emitted from the liquid crystal display device 20, passed through the projection lens 14 and then projected onto the screen 15. The projection lens 14 is disposed such that a collection angle $\theta_{LENS}$ thereof is $\theta_{LC-max}\pm1°$. By varying the voltage applied to the respective pixels of the liquid crystal display device 20 in accordance with a television video signal, a television video can be displayed on the screen 15.

Figure 5A:
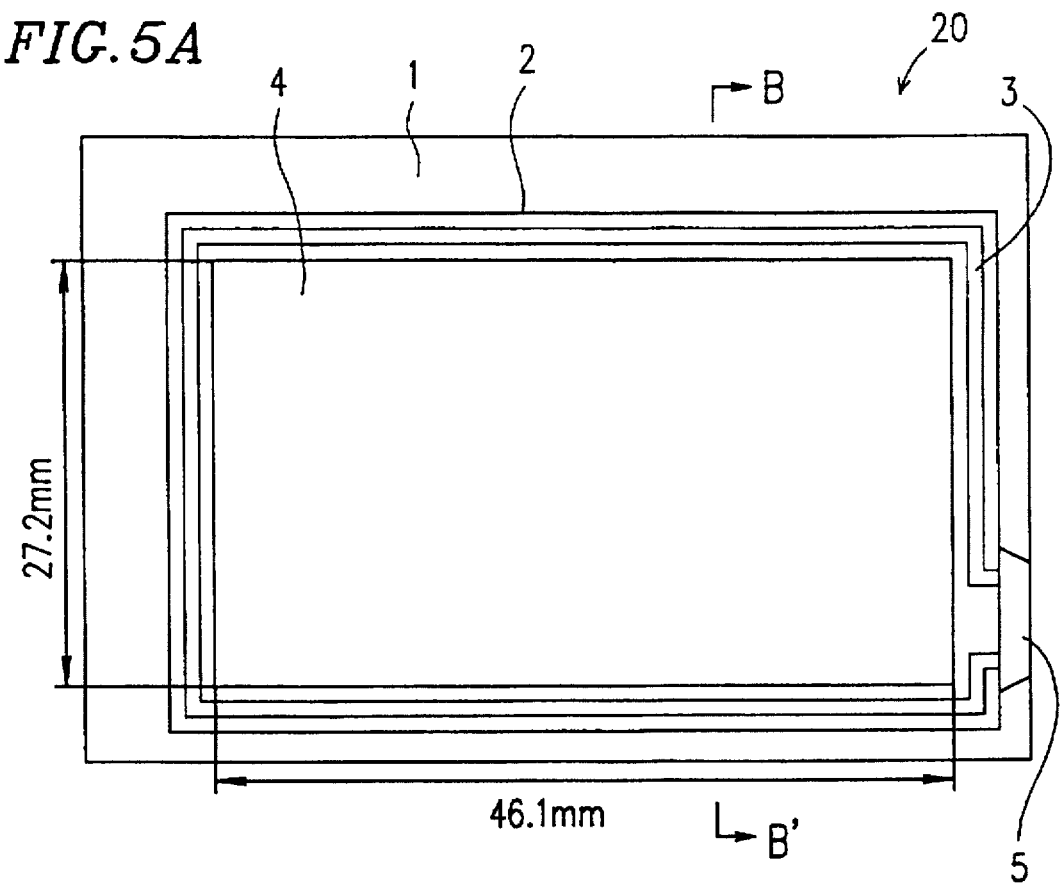
Figure 5B:
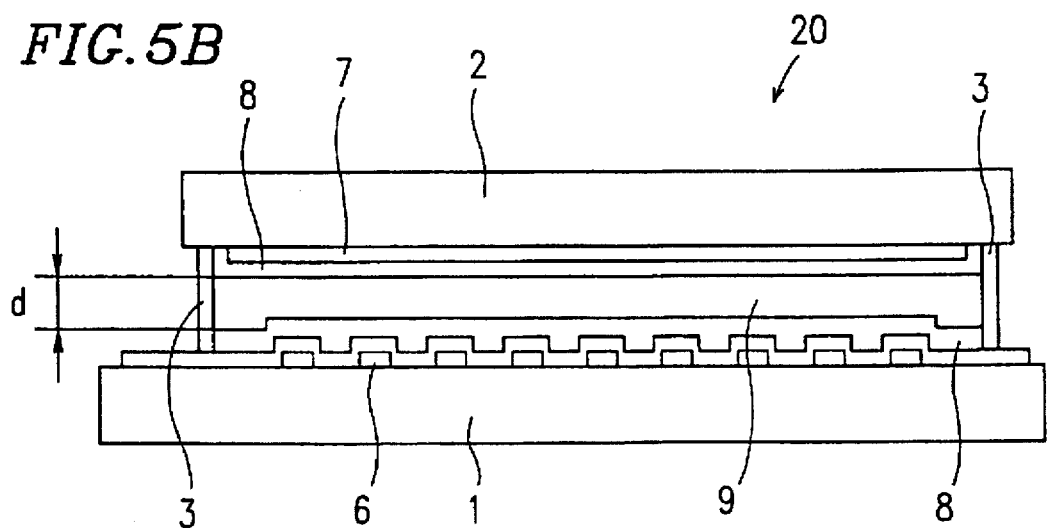
FIG. 5B is a cross-sectional view of the liquid crystal display device used for the projection type liquid crystal display apparatus shown in FIG. 5A as seen along the line B–B'.

FIGS. 5A and 5B show a configuration for a liquid crystal display device used for the projection type liquid crystal display apparatus in the first example of the present invention: FIG. 5A is a front view of the liquid crystal display device; and FIG. 5B is a cross-sectional view thereof. This liquid crystal display device performs a display in TN mode and is configured such that a liquid crystal layer 9 is sandwiched between the glass substrate 1 and the other glass substrate 2. On the glass substrate 1 of the liquid crystal display device 20, a plurality of TFT elements 6 in the form of an amorphous silicon (a-Si) semiconductor layer and ITO transparent electrodes (not shown) are formed. On the other glass substrate 2, a light-blocking pattern 7 and ITO transparent electrodes (not shown) are formed. The peripheries of the two substrates 1 and 2 are adhered to each other via a seal member 3. An alignment film 8, which has been subjected to a rubbing treatment to be described later, is provided on each inner surface of the two substrates 1 and 2.

The size of a display region 4 (or a display portion) of the liquid crystal display device 20 is 46.1 mm×27.2 mm. A Corning 7059 glass substrate (manufactured by Corning Inc.; thickness: 1.1 mm) can be used as each of the glass substrates 1 and 2, for example. A cell thickness (d) of the liquid crystal layer 9 in the display portion is set to be 4.7 μm, and a liquid crystal material having a birefringence (Δn) of 0.093 and a threshold voltage $V_{th}$ of 1.3 V can be used. A hole through which liquid crystal is injected is sealed with an injection hole seal member 5.

Figure 6:
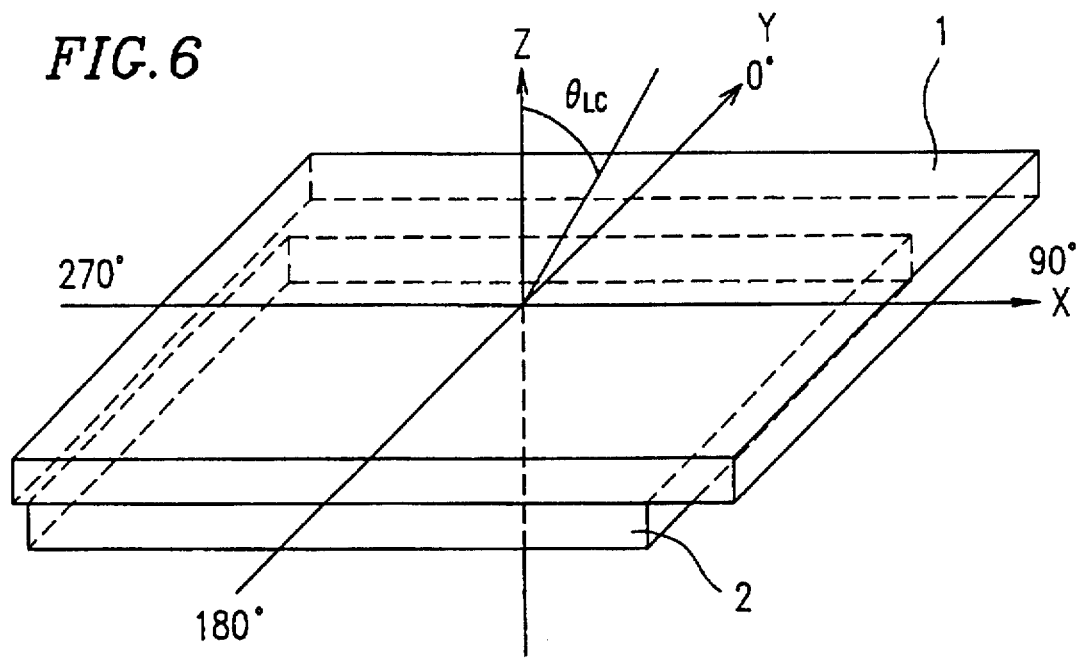
FIG. 6 is a perspective view for defining an X axis, a Y axis, a Z axis and a viewing angle direction $\theta_{LC}$ for the liquid crystal display device shown in FIG. 5.

FIG. 6 is a perspective view for illustrating a viewing angle direction $\theta_{LC}$ of the liquid crystal display device. In FIG. 6, the glass substrate 1 having the TFT elements thereon is regarded as the upper substrate; the vertical axis passing through the center of the liquid crystal display device is defined as a Z axis; a direction parallel to the longer side of the upper glass substrate 1 is defined as an X axis; and a direction parallel to the shorter side of the upper glass substrate 1 is defined as a Y axis. In this case, a tilt angle of the liquid crystal display device from the Z axis toward the X-Y plane is defined as a viewing angle direction $\theta_{LC}$.

Figure 7:
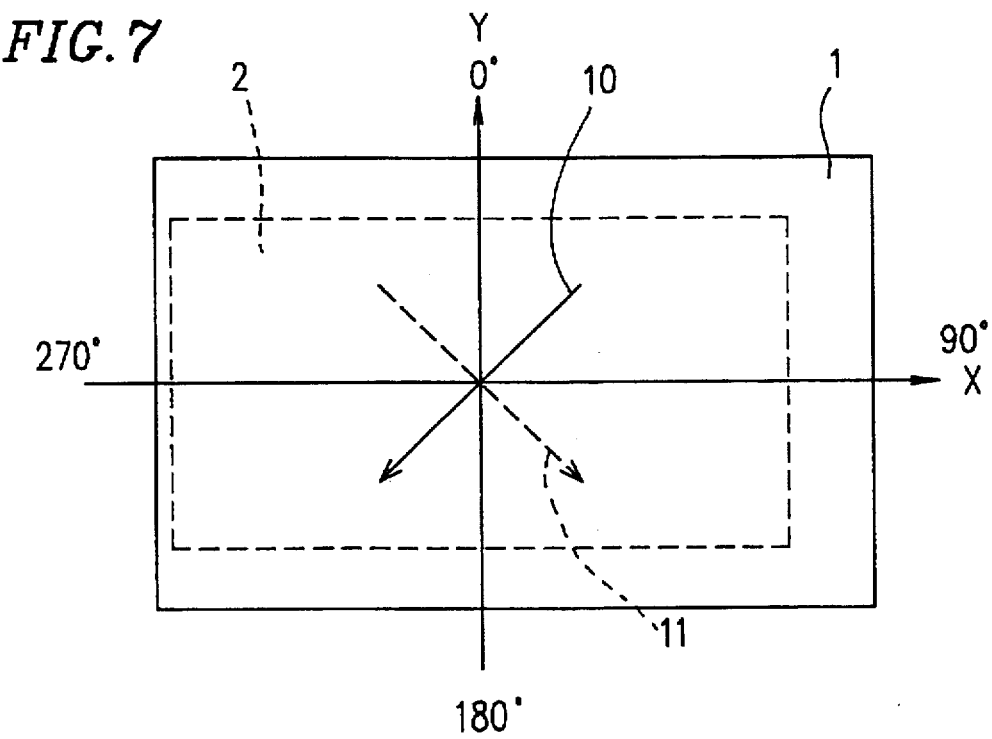
FIG. 7 is a plan view showing alignment directions employed in a rubbing treatment to be performed on the liquid crystal display device shown in FIGS. 5A and 5B.

FIG. 7 shows alignment directions in a rubbing treatment. In this case, the alignment treatment is performed such that the upper glass substrate 1 is rubbed in a direction 10 from +45° to +225° and the lower glass substrate 2 is rubbed in a direction 11 from +315° to +135°.

Figure 8:
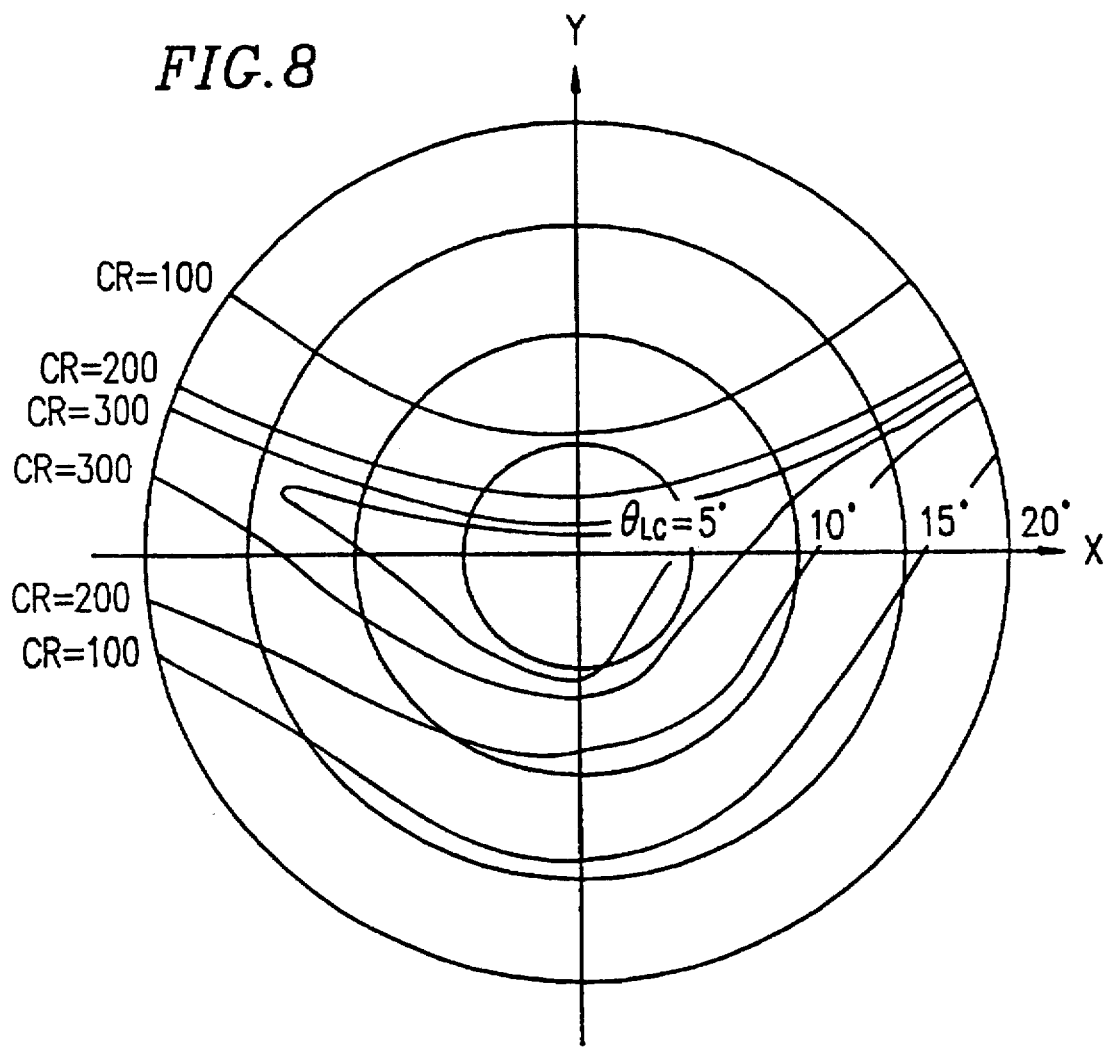
FIG. 8 is a diagram showing viewing angle dependences corresponding to respective contrast ratios in the liquid crystal display device used for the projection type liquid crystal display apparatus in the first example.

FIG. 8 shows viewing angle dependences CR($\theta_{LC}$) corresponding to respective contrast ratios of the liquid crystal display apparatus with respect to a blue light beam having a wavelength of 450 nm. In this case, $V_{LC-max}=0$ V and $V_{LC-min}=4.5$ V. A liquid crystal panel estimation apparatus LCD-5100 (manufactured by Otsuka Electronics Co., LTD) is used for this measurement.

As shown in FIG. 8, a maximum contrast viewing angle direction has deviated from the Z axis ($\theta_{LC}=0$). More specifically, as understood from FIG. 3 showing a relationship between a viewing angle $\theta_{LC}$ and the contrast ratio, at a peak contrast ratio the viewing angle direction is tilted by 3° in a direction (e.g., in −Y direction) in the Y-Z plane (see FIG. 6).

Figure 9:
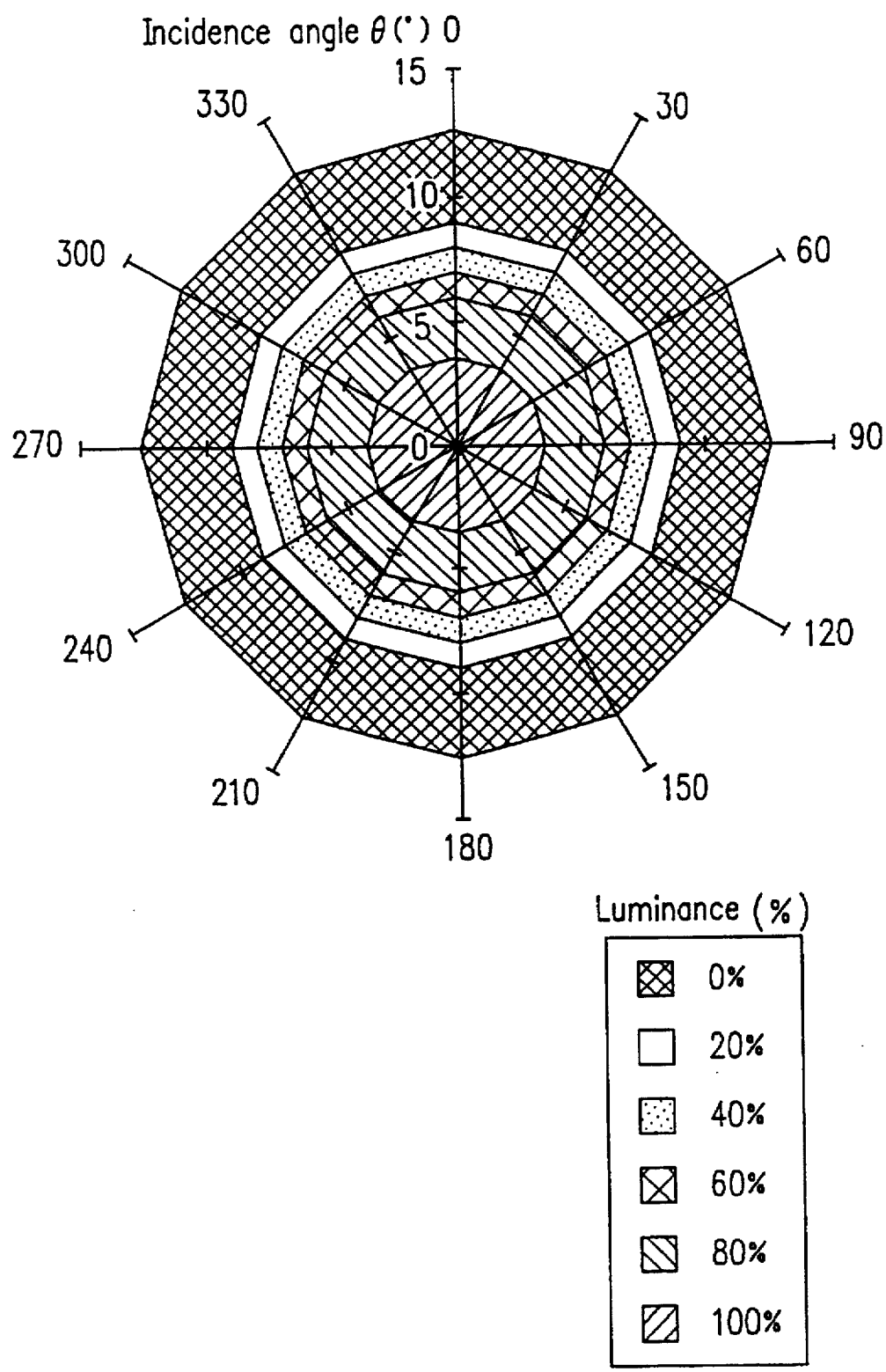
FIG. 9 is a diagram showing the distribution of luminance $t(\theta)$ with respect to an angle $\theta$ of the light incident onto the liquid crystal display device used for the projection type liquid crystal display apparatus in the first example.

The liquid crystal display device 20 is disposed such that the optical axis 16 of the projection type liquid crystal display apparatus in the first example shown in FIG. 4 is aligned with a maximum contrast viewing angle direction of the liquid crystal display device 20, or that a tilt angle $\theta_{max}$ formed between the direction along the surface of the glass substrate 1 of the liquid crystal display device 20 and the direction vertical to the optical axis 16 becomes 3°. The distribution of luminances t(θ) with respect to the angle θ of the light incident onto the liquid crystal display device 20 is shown in FIG. 9.

FIG. 1 is a graph plotting maximum viewing angles $\theta_{LC-max}$ in which contrast ratios $CR_{PROJ}$ represented by Equation (2) become equal to 200, 300, 400 and 500, respectively. In this case, the results measured by the liquid crystal panel estimation apparatus LCD-5100 (manufactured by Otsuka Electronics Co., LTD) as shown in FIG. 8 are used as viewing angle dependences CR($\theta_{LC}$) corresponding to respective contrast ratios.

As understood from FIG. 1, when a target contrast ratio $CR_{TARGET1}=300(\lambda=450$ nm), $\theta_{LC-max1}\approx9°$. On the other hand, when $CR_{TARGET2}=400(\lambda=450$ nm), $\theta_{LC-max2}\approx6°$.

In actuality, the results obtained by exchanging the projection lens in the optical system shown in FIG. 4 for a new lens and measuring a contrast ratio of the light emitted through the new projection lens by using a luminance meter BM-5 (manufactured by Topcon Corp.) are plotted in FIG. 1. As a result of the measurement, when $\theta_{LENS1}(\theta_{LC\text{-}Max1}) \approx 9°$, $CR_{PROJ1}=320$. On the other hand, when $\theta_{LENS2}(\theta_{LC\text{-}max2}) \approx 6°$, $CR_{PROJ2}=390$. Consequently, it has been confirmed that these measured values exist within the tolerance range or ±15% with respect to the result calculated by Equation (2).

In the first example, the present invention has been described as applied to a projection type liquid crystal display apparatus including one liquid crystal display device. However, the present invention is not limited thereto, but is widely applicable to a projection type liquid crystal display apparatus for performing color display using a plurality of liquid crystal display devices. In such a case, it is only necessary to use three liquid crystal display devices for red, green and blue, respectively, for forming color image light.

Moreover, in the first example, the present invention is assumed to be applied to a liquid crystal display device in normally white TN mode. Alternatively, the present invention is applicable to a liquid crystal display mode in which a contrast ratio depends upon a viewing angle, e.g., normally black TN mode and super twisted nematic (STN) mode.

EXAMPLE 2

In this second example, a liquid crystal display device of the same type as that of the liquid crystal display device 20 of the first example is used, while a birefringence $\Delta n$ of a liquid crystal material is fixed at 0.93 and a cell thickness (d) is varied in the condition $u=d\cdot\Delta n/\lambda$.

Figure 10:
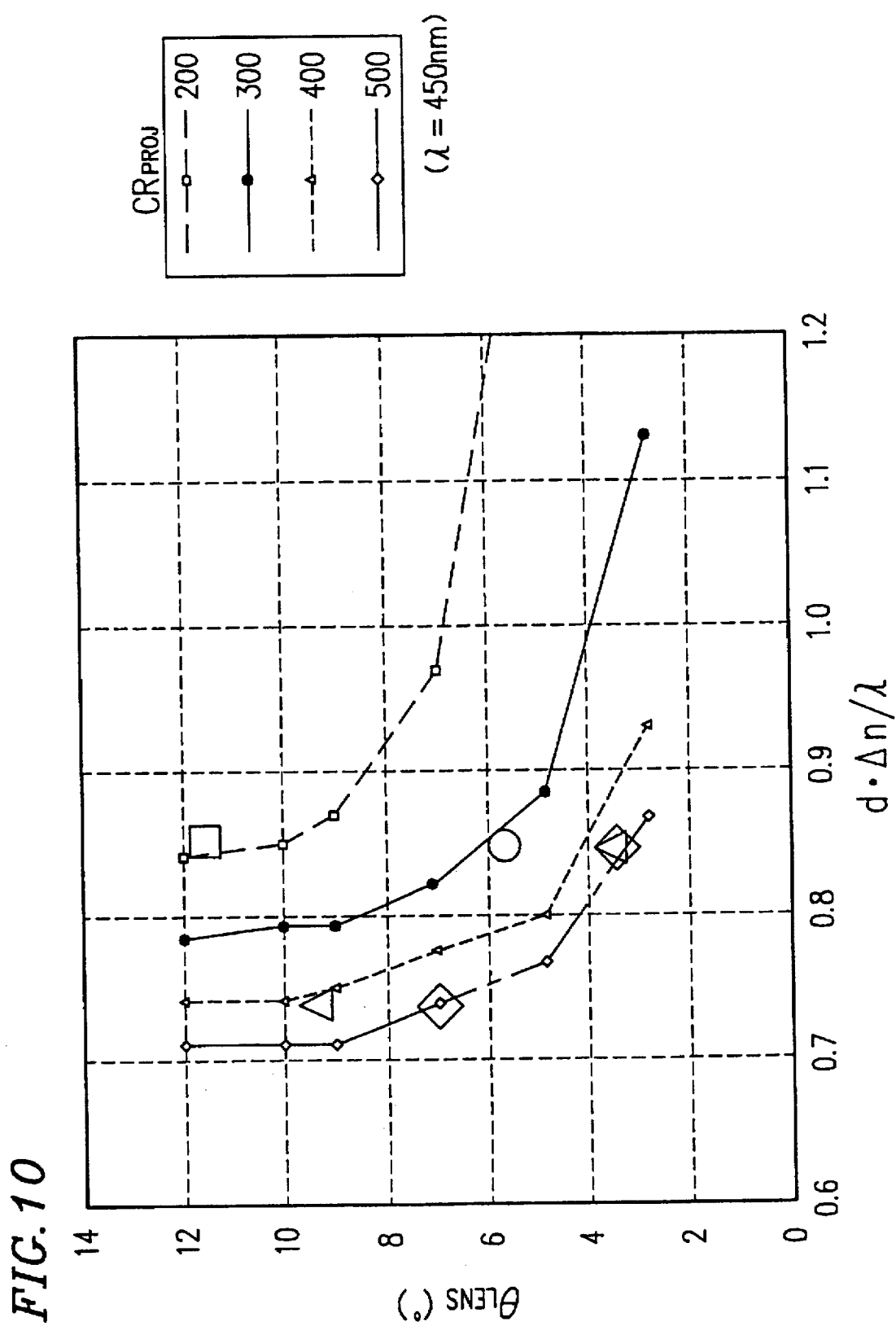
FIG. 10 is a graph showing the calculation results of the dependences of collection angles $\theta_{LENS}$ at which contrast ratios $CR_{PROJ}$ of the light emitted through the projection lens become 200, 300, 400 and 500, respectively.

FIG. 10 shows the results, calculated based on Equation (2), of the dependences of maximum viewing angles $\theta_{LC\text{-}max}(=\theta_{LENS})$ at which contrast ratios $CR_{PROJ}$ of the light emitted through the projection lens become 200, 300, 400 and 500, respectively. In this case, a liquid crystal panel estimation apparatus LCD-5100 (manufactured by Otsuka Electronics Co., LTD) is used for measuring the viewing angle dependences $CR(\theta_{LC})$ corresponding to the respective contrast ratios. The distribution of luminances $t(\theta)$ is the same as that in the first example.

In addition, the measurement results (enlarged ○, ◇, □ and △) of the collection angles $\theta_{LENS}(=\theta_{LC\text{-}max})$ of the projectionlens at which contrast ratios $CR_{PROJ}$ of the light emitted through the projection lens become 200, 300, 400 and 500, respectively, when $\Delta n=0.123$ and $d=3.8$ μm and $3.3$ μm. A luminance meter BM-5 (product name; manufactured by Topcon Corp.) is used for this measurement. Based on these results, it has been confirmed that a correlation can be established with the above-described calculation results.

Figure 11:
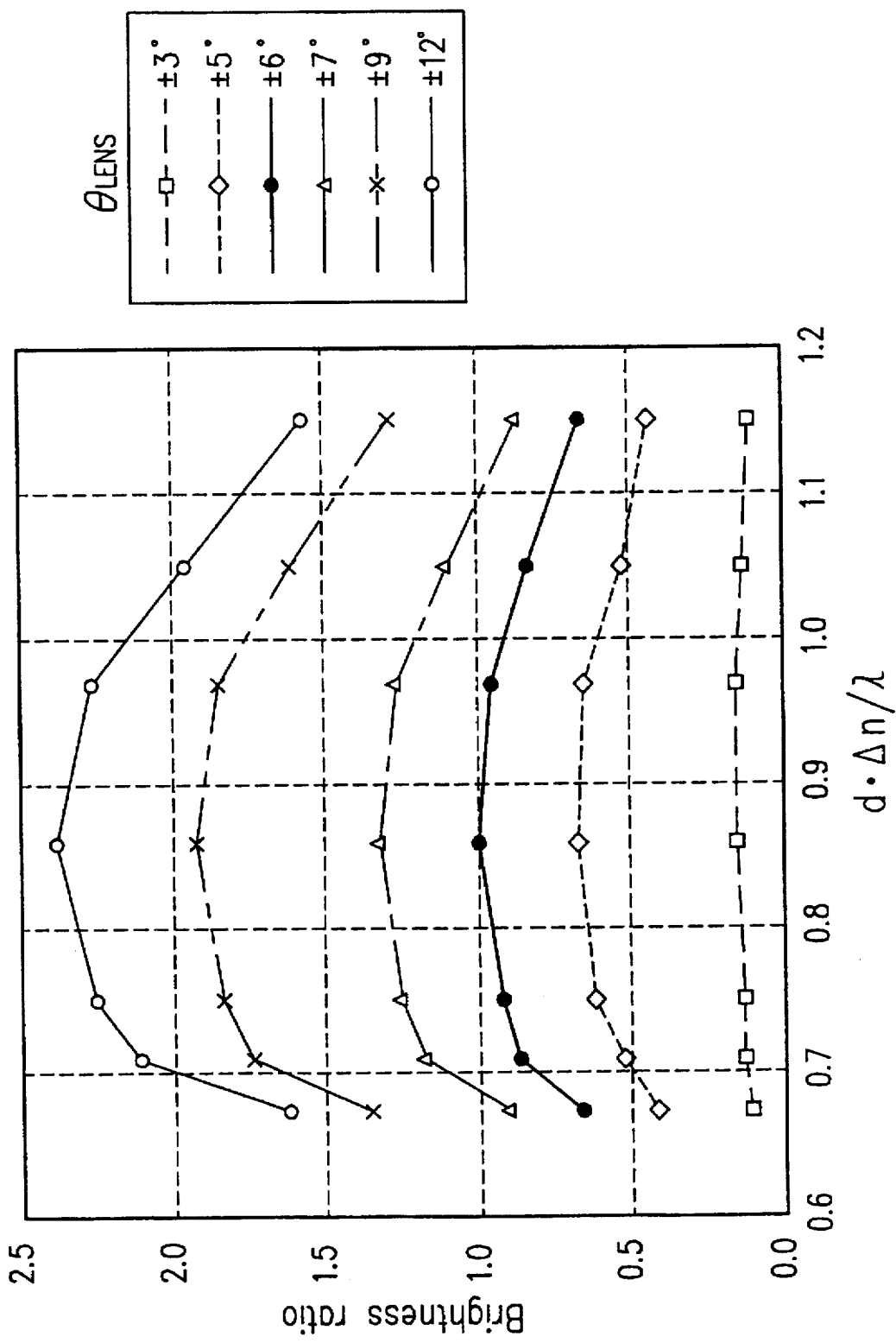
FIG. 11 is a graph showing a relationship between $u=d \cdot \Delta n/\lambda$ and a brightness ratio with respect to respective collection angles $\theta_{LENS}$ of the projection lens in the second example.

The results obtained by measuring the brightness of the projected light under the above-described conditions are shown in FIG. 11. A luminance meter BM-5 is also used for this measurement. In FIG. 11, a maximum brightness of the projected light under conventional conditions where $\theta_{LENS}=\pm6°$ is assumed to be "1" and relative brightness ratios are associated with the dependences upon u (=d·Δn/λ) with respect to the respective collection angles $\theta_{LENS}$ of the projection lens such that $u=d\cdot\Delta n/\lambda=0.86(\lambda=550$ nm) and that a blue contrast ratio ($\lambda=450$ nm) of about 300 can be secured.

Based on the results shown in FIG. 11, it can be confirmed that there surely is a region in which the brightness does not become lower than the brightness of conventional projected light even when $\theta_{LENS} \geq \pm 6°$ and $u \leq 0.86$.

Figure 12:
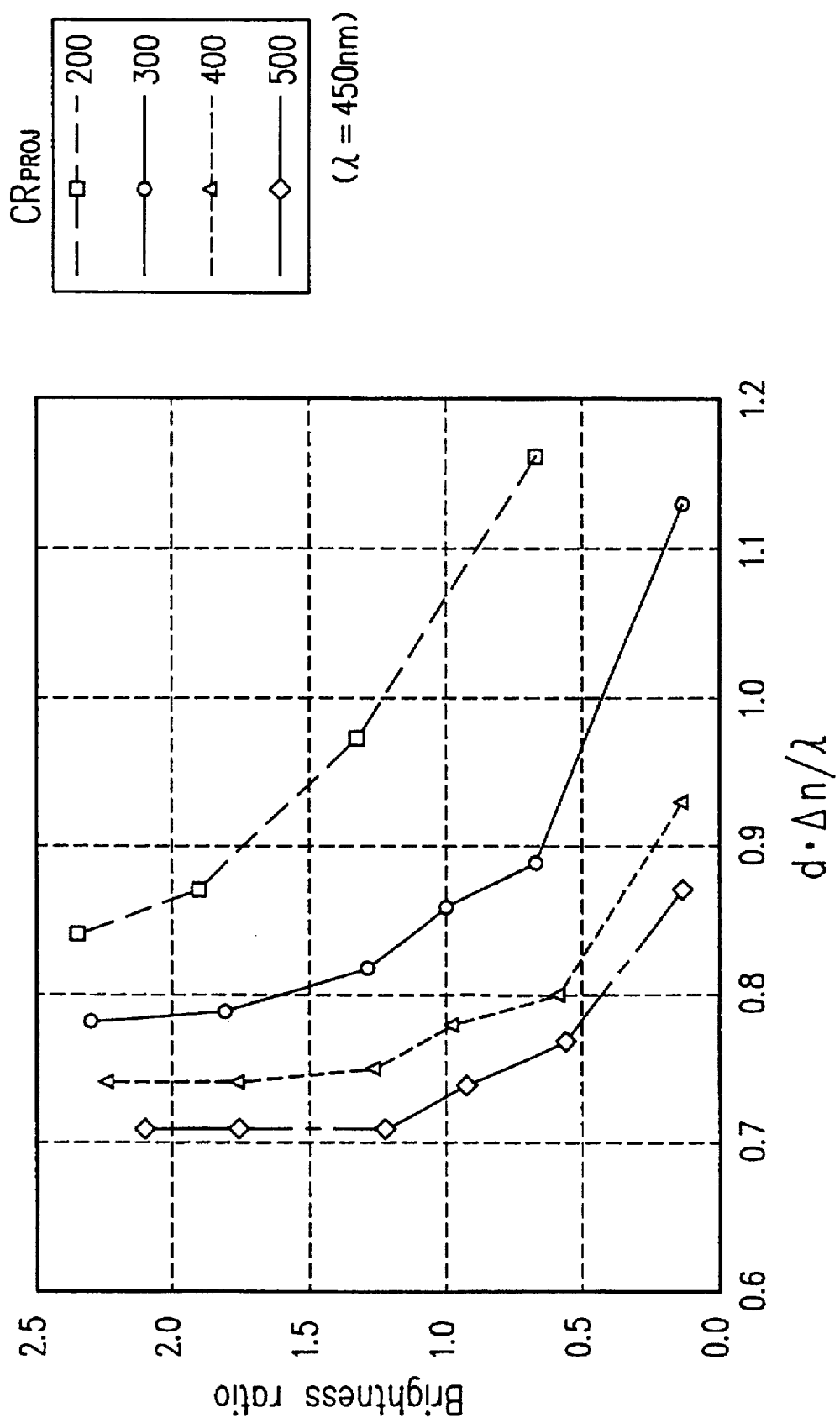
FIG. 12 is a graph showing a relationship between $u=d \cdot \Delta n/\lambda$ and a brightness ratio with respect to respective contrast ratios in the second example.
Figure 13:
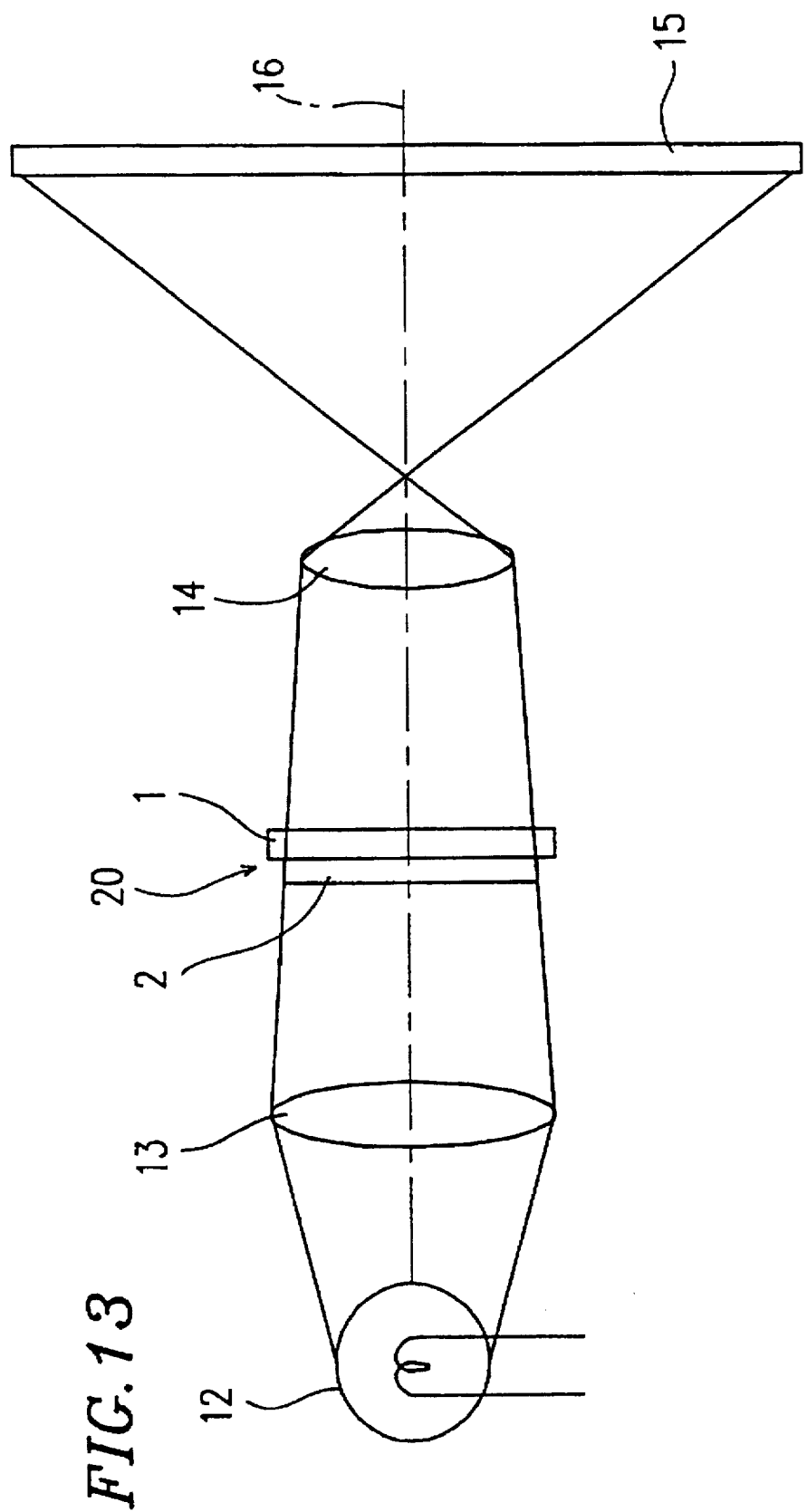
FIG. 13 shows an arrangement for a conventional projection type liquid crystal display apparatus.
Figure 14:
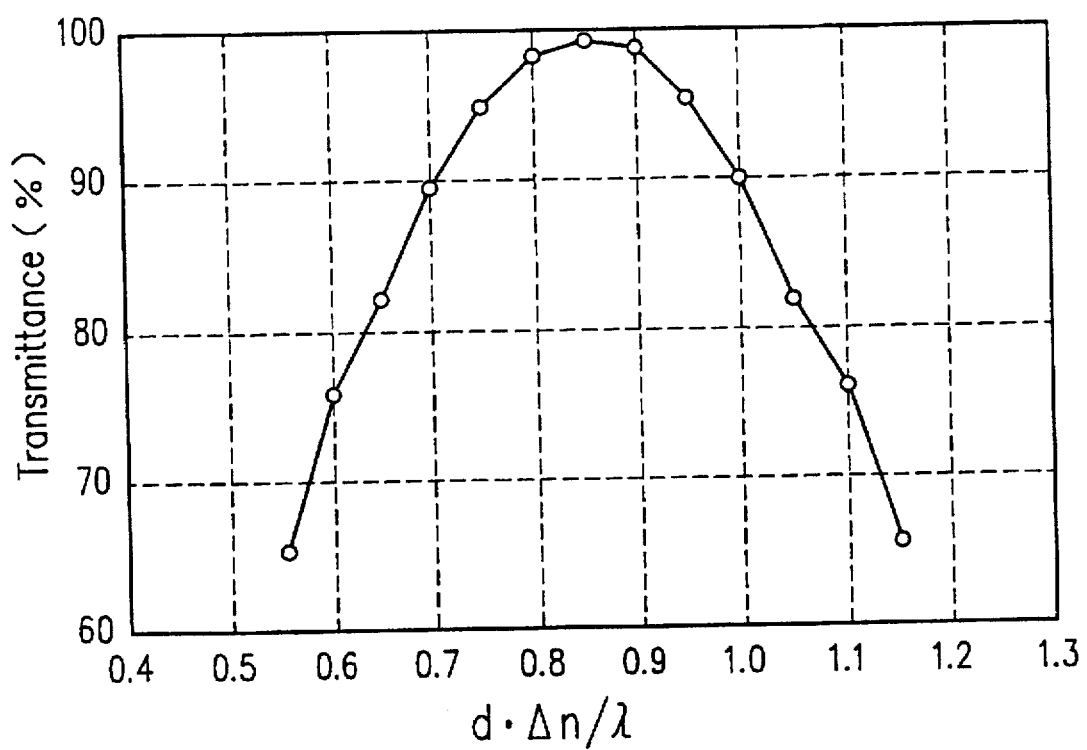
FIG. 14 is a graph showing a relationship between $u=d \cdot \Delta n/\lambda$ and transmittance of a liquid crystal display device in which a liquid crystal cell in twisted nematic mode is provided between a pair of polarizers disposed such that the polarization axes thereof cross each other at a right angle.
Figure 15:
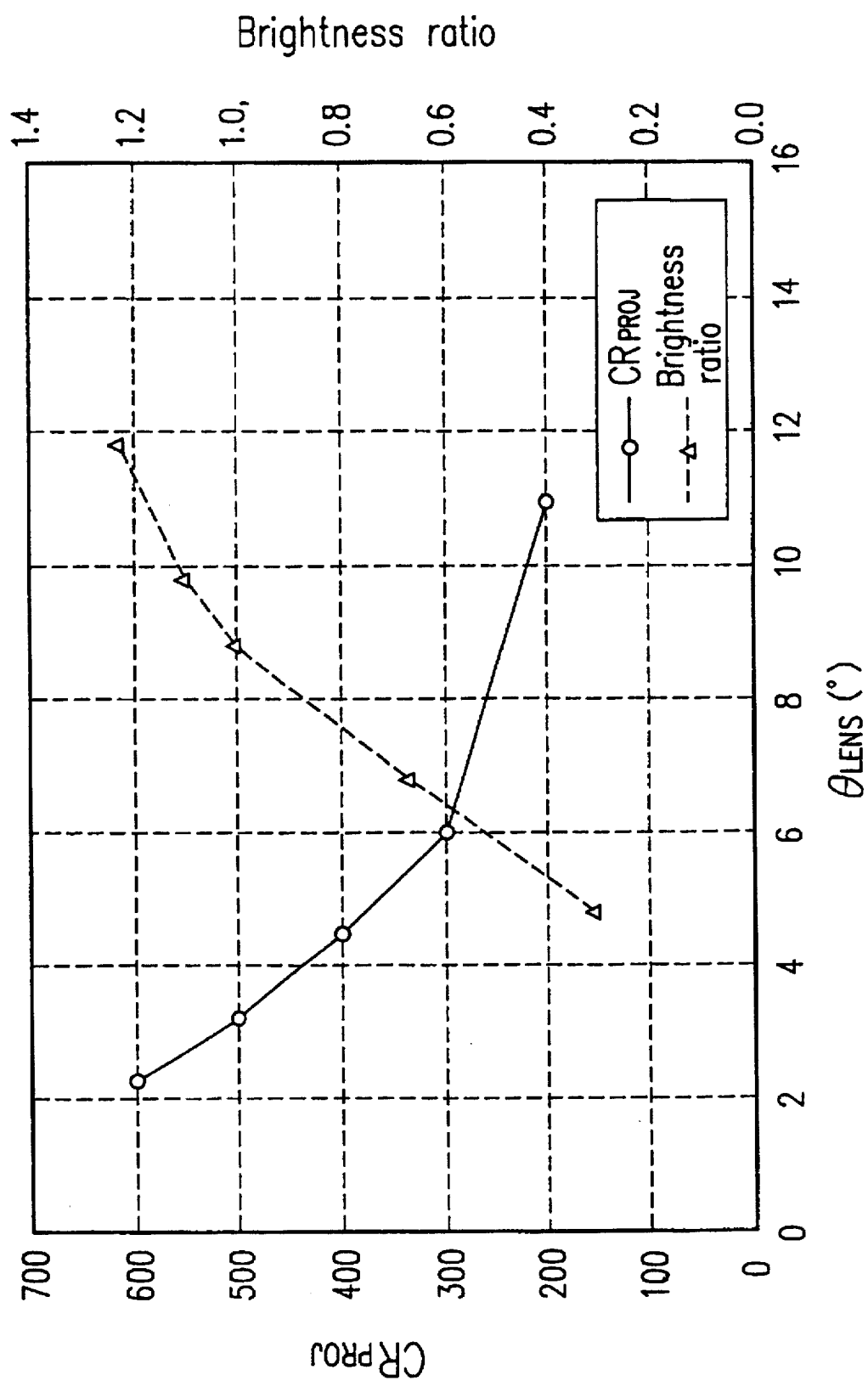
FIG. 15 is a graph showing a relationship among a collection angle $\theta_{LENS}$ of the projection lens, a contrast ratio $CR_{PROJ}$ and a brightness ratio.

FIG. 12 is a graph showing a relationship between $u=d\cdot\Delta n/\lambda$ (as an abscissa) and a brightness ratio (as an ordinate) shown in FIG. 11 with respect to respective contrast ratios $CR_{PROJ}$. FIG. 12 is drawn such that a range in which the above-described conditions are satisfied can be recognized. In FIG. 12, $\theta_{LENS}$ are selected in accordance with FIG. 10.

As is apparent from these results, a contrast ratio $CR_{PROJ}$ equal to or higher than 300 ($\lambda=450$ nm) is realized without decreasing the brightness to be less than the brightness of conventional projected light so long as $\pm 6° \leq \theta_{Lens} \leq \pm 12°$ and $u \leq 0.86$.

As in the first example, the present invention has been described as being applied to a projection type liquid crystal display apparatus including one liquid crystal display device. However, the present invention is not limited thereto, but is widely applicable to a projection type liquid crystal display apparatus for performing color display using a plurality of liquid crystal display devices. In such a case, it is only necessary to use three liquid crystal display devices for red, green and blue, respectively, for forming color image light.

Moreover, in the first and the second examples described above, the present invention is assumed to be applied to a liquid crystal display device in TN mode. Alternatively, the present invention is also applicable to a liquid crystal display mode in which a contrast ratio depends upon a viewing angle, e.g., STN mode.

As is apparent from the foregoing detailed description, according to the present invention, it is possible to provide a projection type liquid crystal display apparatus which can display a bright image realizing a high contrast ratio.

In such a case, the contrast ratio of the light emitted through the projection lens can be determined by the following Equation (1):

$$CR_{PROJ} = \int T_{max}(\theta_{LC}, u, V_{LC\text{-}max}) \cdot t(\theta_{LC}) d\theta_{LC} / \int T_{min}(\theta_{LC}, u, V_{LC\text{-}min}) \cdot t(\theta_{LC}) d\theta_{LC} \quad (1)$$

As a result, it is possible to set a collection angle $\theta_{LENS}$ of the projection lens for obtaining a target contrast ratio $CR_{TARGET}$, a luminance $t(\theta)$ with respect to the angle $\theta$ of the light incident onto the liquid crystal display device and the condition d·Δn/λ for the liquid crystal display device at optimum values. Furthermore, in this case, a maximum brightness (BR) of the projected light can be determined by the following Equation (3):

$$BR = A \int T_{max}(\theta_{LC}, u, V_{LC\text{-}max}) \cdot t(\theta_{LC}) d\theta_{LC} \text{(where A is a luminance ratio constant)} \quad (3)$$

Particularly when the distribution of the luminance $t(\theta)$ with respect to the angle $\theta$ of the light incident onto a liquid crystal display device of an optical system in a generally used projection type liquid crystal display apparatus is about ±12° (a collimation degree of a light source) in an effective luminance range; $\pm 6° \leq \theta_{LENS} \leq \pm 12°$; and $\Delta n d/\lambda < 0.86$, a contrast ratio $CR_{PROJ}$ of the light emitted through the projection lens can be equal to or higher than 300 ($\lambda=450$ nm) without decreasing the brightness to be less than the brightness of conventional projected light.

Furthermore, even when any other light valve is substituted for the liquid crystal display device of the present invention, so long as a contrast ratio and a display luminance of the light valve have some viewing angle dependence, the present invention can provide conditions suitable for simultaneously increasing a contrast ratio and a luminance of the light valve.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A projection type liquid crystal display apparatus comprising:

a light source;

a liquid crystal display device which receives a light beam emitted from the light source and forms an image light beam, the liquid crystal display device including a liquid crystal layer sandwiched between a pair of substrates, and electrodes for controlling an electro-optical effect of the liquid crystal layer; and a projection lens which receives the image light beam and directs the image light beam onto a screen, wherein the projection lens and the liquid crystal display device are disposed to satisfy the relationship:

$$\theta_{LC\text{-}max} - 1° \leq \theta_{LENS} \leq \theta_{LC\text{-}max} + 1°,$$

where $\theta_{LENS}$ is a collection angle of the projection lens and $\theta_{LC\text{-}max}$ is a maximum viewing angle of the liquid crystal display device, at which a contrast ratio of the image light beam emitted through the projection lens $CR_{PROJ}$ is equal to a prescribed contrast ratio $CR_{TARGET}$, and $CR_{PROJ}$ is calculated by the following equation:

$$CR_{PROJ} = \int T_{max}(\theta_{LC}, u, V_{LC\text{-}max}) \cdot t(\theta_{LC}) \, d\theta_{LC} / \int T_{min}(\theta_{LC}, u, V_{LC\text{-}min}) \cdot t(\theta_{LC}) \, d\theta_{LC},$$

where $u = d \cdot \Delta n / \lambda$; d is a thickness of the liquid crystal layer; $\Delta n$ is a birefringence of a liquid crystal material of the liquid crystal layer; $\lambda$ is a wavelength of the light beam; $t(\theta)$ is a luminance at an angle $\theta$ of the light beam incident onto the liquid crystal display device; $\theta_{LC}$ is a viewing angle of the liquid crystal display device with respect to the normal to a display plane of the liquid crystal display device; $V_{LC\text{-}max}$ is a voltage applied to the liquid crystal layer for maximizing a transmittance of the liquid crystal display device; $V_{LC\text{-}min}$ is a voltage applied to the liquid crystal layer for minimizing the transmittance of the liquid crystal display device; $T_{max}(\theta_{LC}, u, V_{LC\text{-}max})$ is a maximum transmittance at $\theta_{LC}$; and $T_{min}(\theta_{LC}, u, V_{LC\text{-}max})$ is a minimum transmittance at $\theta_{LC}$.

2. A projection type liquid crystal display apparatus according to claim 1, wherein d and $\Delta n$ are set such that $d \cdot \Delta n / \lambda$ is within the range of $u_{TARGET} - 0.05 \leq d \cdot \Delta n / \lambda \leq u_{TARGET} + 0.05$, where $u_{TARGET}$ is a prescribed u value which satisfies the condition that $CR_{PROJ}$ is equal to $CR_{TARGET}$ at the collection angle of the projection lens $\theta_{LENS}$.

3. A projection type liquid crystal display apparatus according to claim 2, wherein the liquid crystal display device is disposed such that a viewing angle direction of the liquid crystal display device for exhibiting a maximum contrast ratio is aligned with an optical axis of the light beam incident onto the liquid crystal display device.

4. A projection type liquid crystal display apparatus according to claim 3, wherein $u \leq 0.86$ and $6° \leq \theta_{LENS} \leq 12°$ such that a contrast ratio for a blue light beam becomes 300 or higher.

5. A projection type liquid crystal display apparatus according to claim 2, wherein $u \leq 0.86$ and $6° \leq \theta_{LENS} \leq 12°$ such that a contrast ratio for a blue light beam becomes 300 or higher.

6. A projection type liquid crystal display apparatus according to claim 1, wherein the liquid crystal display device is disposed such that a viewing angle direction of the liquid crystal display device for exhibiting a maximum contrast ratio is aligned with an optical axis of the light beam incident onto the liquid crystal display device.

7. A projection type liquid crystal display apparatus according to claim 6, wherein $u \leq 0.86$ and $6° \leq \theta_{LENS} \leq 12°$ such that a contrast ratio for a blue light beam becomes 300 or higher.

8. A projection type liquid crystal display apparatus according to claim 1, wherein $u \leq 0.86$ and $6° \leq \theta_{LENS} \leq 12°$ such that a contrast ratio for a blue light beam becomes 300 or higher.

* * * * *